United States Patent
Mallinson et al.

(10) Patent No.: US 7,680,173 B2
(45) Date of Patent: Mar. 16, 2010

(54) SPREAD SPECTRUM CLOCK GENERATOR HAVING AN ADJUSTABLE DELAY LINE

(75) Inventors: Andrew Martin Mallinson, Kelowna (CA); Simon Damphousse, Kelowna (CA)

(73) Assignee: ESS Technology, Inc., Fremont, CA (US)

( * ) Notice: Subject to any disclaimer, the term of this patent is extended or adjusted under 35 U.S.C. 154(b) by 848 days.

(21) Appl. No.: 11/479,537

(22) Filed: Jun. 30, 2006

(65) Prior Publication Data

US 2007/0019711 A1    Jan. 25, 2007

Related U.S. Application Data

(60) Provisional application No. 60/697,329, filed on Jul. 6, 2005.

(51) Int. Cl.
    H04B 1/69    (2006.01)
(52) U.S. Cl. ...................................................... 375/130
(58) Field of Classification Search ................... 375/130
    See application file for complete search history.

(56) References Cited

U.S. PATENT DOCUMENTS

| 5,017,889 | A | * | 5/1991 | Verbeek ........................ 331/1 A |
| 5,148,383 | A | * | 9/1992 | Jaeger ........................ 708/319 |
| 5,451,894 | A | * | 9/1995 | Guo ........................... 327/241 |
| 5,488,627 | A | | 1/1996 | Hardin et al. |
| 5,689,525 | A | | 11/1997 | Takeishi et al. |
| 6,366,174 | B1 | | 4/2002 | Berry et al. |
| 6,647,052 | B2 | | 11/2003 | Hailey |
| 6,775,342 | B1 | | 8/2004 | Young et al. |
| 2001/0028675 | A1 | | 10/2001 | Bierly et al. |
| 2002/0129070 | A1 | | 9/2002 | Mallinson |
| 2003/0081660 | A1 | * | 5/2003 | King et al. .................. 375/150 |

FOREIGN PATENT DOCUMENTS

WO    WO 03/039045 A2    5/2003

* cited by examiner

*Primary Examiner*—Don N Vo
(74) *Attorney, Agent, or Firm*—Kenta Suzue; Haynes Beffel & Wolfeld LLP (57) ABSTRACT

A system and method are provided for performing a spread spectrum clock generation, where the system includes self-adjusting delay line configured to spread the spectrum of a fixed circuit using a fixed clock frequency and a delay circuit configured to generate an adjustment signal to the delay line by adding or subtracting an addition delay per cycle, therefore causing a shift in the output clock frequency, wherein the amount of shift is proportional to the rate of addition or subtraction of delay.

12 Claims, 12 Drawing Sheets

Figure 3: Three different types of modulation for SSCG.

Figure 4: Top level block diagram of the all digital SSCG circuit.

Invited Paper Solid State Journal: All-Digital SSCG for EMI Reduction

Figure 6: Modulating a clock with a digital delay line of finite length with a monitor module for transparent wrap around.

Figure 5: Modulating a clock with a long digital delay line.

Invited Paper Solid State Journal: All-Digital SSCG for EMI Reduction

Figure 7: Calibration of the circuit using the number of tap per period.

Figure 8: Up spread is performed by moving back by the number of tap in a period.

Figure 9: Block diagram of the digital delay line.

Figure 11: Time delay of a single cell in the digital delay line.

Figure 10: Schematic of a single cell in the digital delay line.

Figure 12: Block diagram of the entire SSCG circuit.

Invited Paper Solid State Journal: All-Digital SSCG for EMI Reduction

Figure 13: Typical implementation of the all digital SSCG in a system.

Invited Paper Solid State Journal: All-Digital SSCG for EMI Reduction

Figure 15: Modulation of the SSCG circuit in the transient state of correcting the error of the wrap around.

Figure 14: Simulation of the circuit showing the period of each cycle for a up spread and a down spread configuration.

Figure 17: A few periods of the SSCG modulation once the correction loop in steady state condition.

Figure 16: A few periods of the SSCG modulation showing spikes in the wrap around process while the correction loop still in transitory state.

Figure 18: Measured spectrum of the SSCG clock with 3% frequency deviation and 100 KHz frequency modulation. More than 13 dB peak power reduction is observed.

Invited Paper Solid State Journal: All-Digital SSCG for EMI Reduction

SPREAD SPECTRUM CLOCK GENERATOR HAVING AN ADJUSTABLE DELAY LINE

RELATED APPLICATIONS

The invention claims the benefit of the filing date for U.S. Provisional Application No. 60/697,329 Filed Jul. 6, 2006.

BACKGROUND

Electromagnetic interference (EMI) in electronic products such as a home theater system or DVD players is a real issue that must be dealt with in order to meet the maximum allowed regulated level.

There are many techniques to reduce the radiated power and all of them add to the cost of a given product. The most obvious way to reduce the actual electromagnetic energy radiated from a product is to increase the shielding of the box in which the electronic circuits are placed. With this method, the hardware and assembly add significant cost to the product.

Figure 3:
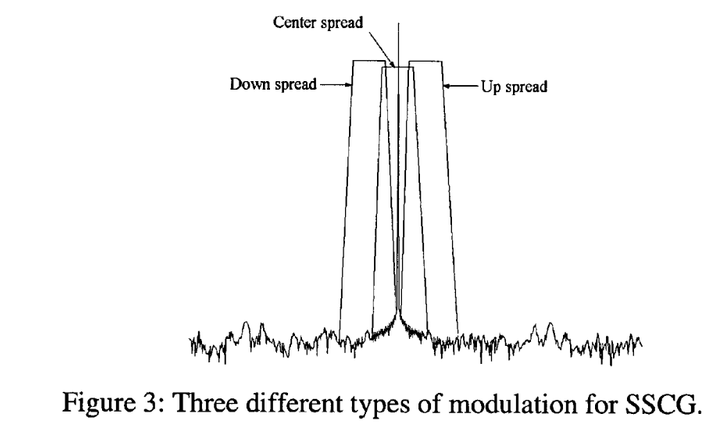
FIG. 3 is an illustration of different resulting SSCG outputs known in the art.

A less obvious method that is known in the art is to modulate the system clock of the computing devices such that the radiated power level in a given bandwidth is lower. It is called spread spectrum clock generation (SSCG). This technique is effective and popular since the system clock is one of the major contributors in EMI and the cost to the system is minimal. The legislation governing EMI in products specifies that the radiated power limits per bandwidth unit and the standard bandwidth for this type of measurement is 120 KHz. It is easy to understand the advantages of modulating the system clock in that context, but care must be taken to guarantee adequate operation. For example, it would detrimental to modulate the frequency up from the reference in a digital system with very little margin in setup and hold time. It would be equally bad for a digital system performing a real time application up to its speed limit and modulating the frequency down from the reference. In order to address these issues, SSCG circuits in general can modulate the reference frequency down, up or center. FIG. 3 shows the three types of modulation, Up, Down and Center spread.

The commonly used technique to produce SSCG is an "all analog" one where modulation is applied or inserted into a phased lock loop (PLL). The frequency can be modulated by imposing a signal on the voltage control node of a VCO in a PLL. This method is the most obvious one in a system with a PLL and is proven to work very well for most applications. There are many other techniques to modulate the system clock. For example, one could uses a "fractional N" technique that changes the divider ratio to produce the modulation. All methods found in the literature use some type of analog circuit. Analog circuit, however, have shortcomings, including a long product integration time, and less predictability in performance.

Therefore, there exists a need for an improved system and method of SSCG. As will be seen, the invention provides such a system and method in an elegant manner.

DETAILED DESCRIPTION

The invention provides a high speed clock system that utilizes a spread spectrum clock generator (SSCG) to perform a spread spectrum process on a digital clock in an effort to reduce EMI. In operation, the spread spectrum clock varies the frequency in order to reduce the average frequency. Generally, the method proposed does not modify the topology or configuration of the original PLL in the system. The spread spectrum is applied to the reference clock, and the configuration is digital. In practice, it has been observed that the product integration time is faster. The invention provides a means to spread the spectrum of a reference clock that in turn can be used as a reference spread spectrum clock for a system PLL producing frequency multiplication. The purpose of the modulation or spread spectrum is to reduce the amount of power per bandwidth of 120 kHz, for example, and hence meet the EMI rules with less shielding or complex mechanical assembly.

The invention provides an effective solution to control electromagnetic interference in computing appliances such as DVD players or home theater systems by applying modulation on the system clock. The presence of modulation on the clock reduces the radiated power per unit bandwidth. The invention provides an implementation of a spread spectrum clock generator (SSCG) using strictly digital components. A digital delay line (DDLi) controlled by a small digital circuit is used to increase or decrease the delay on a clock and hence create a modulated output. The DDLi total electrical length is no longer than one period of the reference clock, because the digital circuit can emulate an infinitely long line. The circuit can produce up or down spread and the measured peak power reduction is greater than 13 dB. In one implementation, the circuit occupies 0.06 mm$^2$ in a 0.15 □m CMOS process and consumes 7.1 mW.

The invention uses an adjustable delay line that is able to spread the spectrum of a fixed frequency, whether the frequency is generated from crystal or a fixed frequency phase locked loop (PLL) circuit. A circuit embodying the invention operates by adding or subtracting an addition delay per cycle, therefore causing a "Doppler" shift[1] in the output clock frequency. The amount of shift is proportional to the rate of addition or subtraction of delay. No modification to an existing clock generator is needed to employ the invention. An optimum pattern of frequency shift may be employed as a table of delay versus clock cycle, rather then change in frequency versus time. Thus, the clock does not need to be modified, and an ordinary precise crystal clock can be employed to provide a high speed clock signal with a significant reduction in EMI.

In one embodiment, the invention provides two operational blocks that together perform a spread spectrum on a digital clock to accomplish reduced EMI. The first block has a digital delay line with a plurality of discrete delay lines to produce a discrete delay of approximately 200 ps per tap. The second block is a logic block that performs the frequency modulation on the clock. Unlike conventional systems that produce modulation by changing the system phase locked loop, the invention provides an entirely digital solution with a delay circuit and no phase locked loop. This is done by modulating the frequency using substantially infinitely long digital delay line, which is emulated by a practical circuit while modulating a clock. The circuit further includes a self-calibrating process that accounts for process and temperature affects. The invention provides the ability to produce increased down spread (toward lower freq) or increased up spread (toward higher freq). The invention enables improved methods for producing Down spread (toward lower frequencies) and Up spread (toward higher frequencies). The invention further enables center spread as defined in FIG. 3 with the up and down spread.

Figure 1:
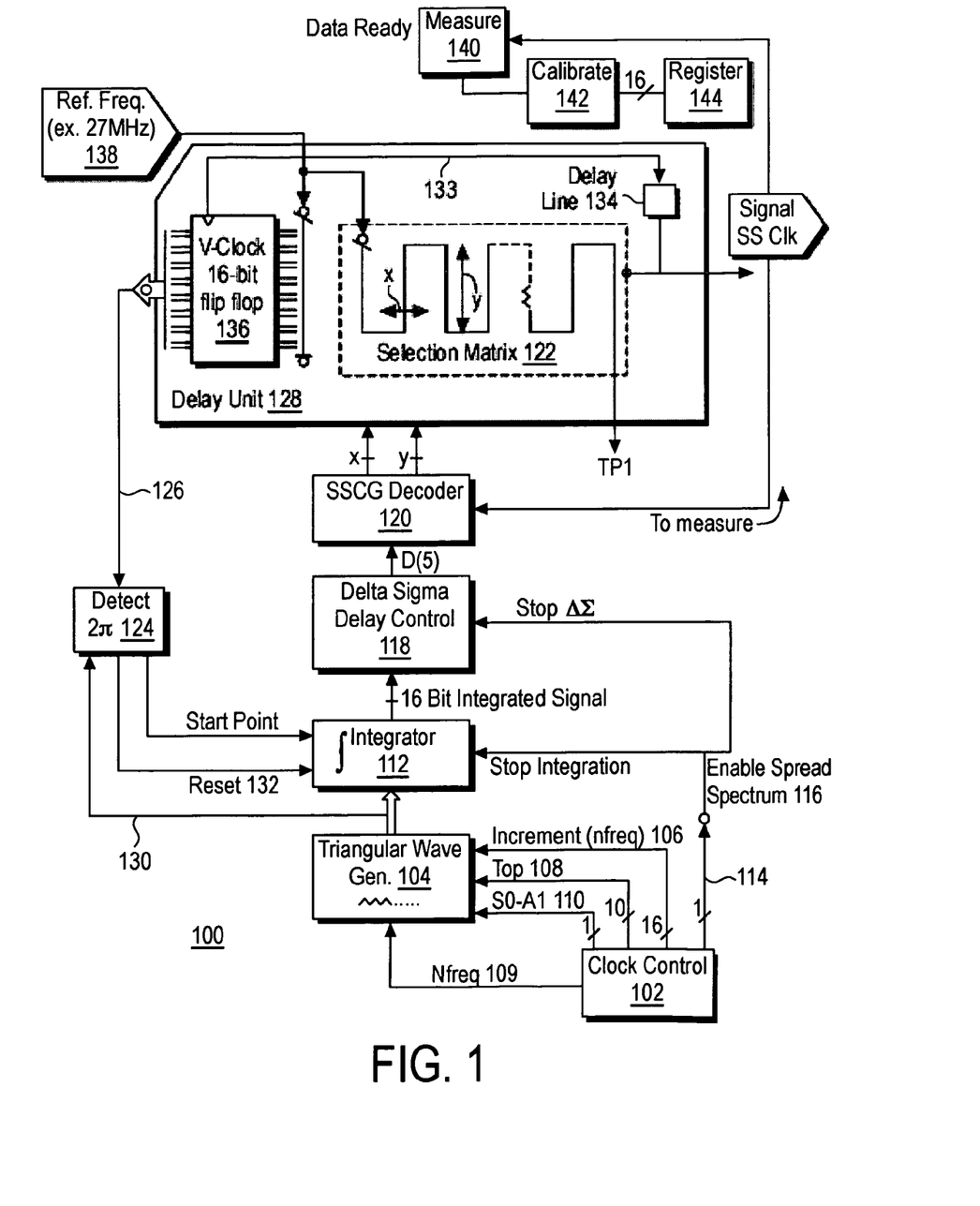
FIG. 1 is a diagrammatic view of one embodiment of the invention.

Referring to FIG. 1, one embodiment of the invention is illustrated, where the circuit operates on its own output, the spread spectrum clock. It is then critical that the clock generated from it be glitch free. This circuit includes a resistor-transistor logic (RTL), illustrated as a multiple input/output flip flop 136, and the delay line 134.

The operation of the circuit is to delay from rising edge to rising edge and modulate the clock. In one embodiment, a delay line possesses 384 taps to select from. The first 16 are duplicated with their output connected to 16 D-type flip flops. The Q output forms a measure of the rise edge and falling edge of the voltage to the delay line.

Still referring to FIG. 1, a block diagram of a system utilizing a spread spectrum clock according to the invention is illustrated. On the digital side, a clock control 102 is configured to control the various inputs to system to control the spread spectrum clock output. A triangular wave generator 104 is set with a certain frequency (nfreq) shown here as a 16 bit number from line 106, that can be adjusted to produce the required frequency deviation.

It can be adjusted manually, but, in one embodiment, the circuit is self calibrated. If the reference frequency is known, and if the number of taps per period of the reference frequency can be measured or estimated, where each one has a certain time delay that is not known with accuracy and that changes over process and temp, then the digital circuit can be adjusted to provide the accurate frequency modulation, which is how fast the frequency changes, and the deviation, which is the amount of which the frequency is changed. The simple trick is to determine how many taps that makes up a period, and then calculating deviation. In this method, no information is required on the absolute tap delay and the calibration of the actual deviation performed. The control also includes a top 108 to preset given amplitudes that represent the frequency modulation amplitude. The control also has an nfreq line 109 that sets the initial frequency for the triangular wave, and can be modified. The triangular wave signal is then sent to integrator 112 and integrated. The clock control 102 further has a separate spread spectrum enable line 114 that has an intermediate enabling inverter 116 to enable and disable the spread spectrum operations as well as the delta sigma control 118. The delta sigma (DS) is used to dither the actual delay tap increase. For example, suppose that over time the increase from cycle to cycle of the clock goes from 3 to 4 then to 5 . . . but will indeed spend lot of cycles at an increase by 3. Then, there would exist a large number of cycles increased by 4, and then finally a large number of cycles that are increased by 5. The DS provides a density change where, by clock cycle, there is a pure 3 increase, then a mix of 3 and 4 then pure 4 and so on. For example, one cycle provides:

33333334343434343434444444444454545454555555555
. . .

where each number here represents the increase of delay for each clock cycle. This is performed by the DS.

The integrator outputs an integrated signal, shown here on a 16 bit. The integral of the frequency gives the absolute phase movement, for example, 2*pi rd/s frequency integrated for 1 sec. This will give 2*pi rad which means that the position of the wave will be at 2*pi rad (360 degrees) after one second. So there exists a triangular wave that describes the frequency over time, the integral of the triangular wave will describe the total distance for the position on the circle, which in turn tells the amplitude of the signal. In practice, the integral of that triangular wave will get very large.

The system provides a larger bus from the integrator, and a number of LSB consumed by the DS modulator to provide the pattern of numbers described above. The delta sigma delay control outputs a delta sigma signal to the SSCG decoder 120, where "X" and "Y" are decoded for the matrix selector 122. This decoder is designed to prevent the two lines of X or Y to be high, or logic one, at the same time. The decoder translates the output number from the delta sigma delay control into "X" and "Y" coordinates to toggle switches, adjusting the delay matrix. This is the equivalent of a SR cell. Simply put, a circuit makes sure (and has nothing to do with the DS) that NOT 2 lines f control can be high at any time. This decoder is very important as it prevents the output to be selected from 2 different taps.

When the delay increases, the signal ultimately reaches a point where there is 2*pi phase difference, where the two rising edges exist in the delay line at a given time. This would occur between the rising edge of the output and the rising at the beginning of that delay line. Rather than a delay unit being of infinite size, a detect 2-pi unit 124 detects this condition. The detect 2-pi unit compares the output 126 from with the output of triangular wave generator through line 130 with the output of the delay unit 126, and resets the integrator 112 with reset line 132. This way, the detect 2-pi unit is configured to reset the system after 2*pi rotation. The total length of that delay line can now be reduced, for example to 40~45 nsec for a 27 MHz clock. The module "detect_2pi" monitor the Q output of the delay line and calculates a value to reset the integrator at the right moment to allow continuous cycling of the delay unit. Since there is a delay between the time the edge of SSClk occurs and the arrival to the delay line 133 flip flop 134 (labeled here as Tau), the detect_2pi module is getting a delayed information indicating where the edge of the pulse signal is located. This delay can vary with process and temperature. To remedy this, the detect 2pi unit 124 has the capability to correct this delay. In one implementation, it can be corrected up to 7 taps, giving a correction time of typically 1.4 nanoseconds.

Figure 2:
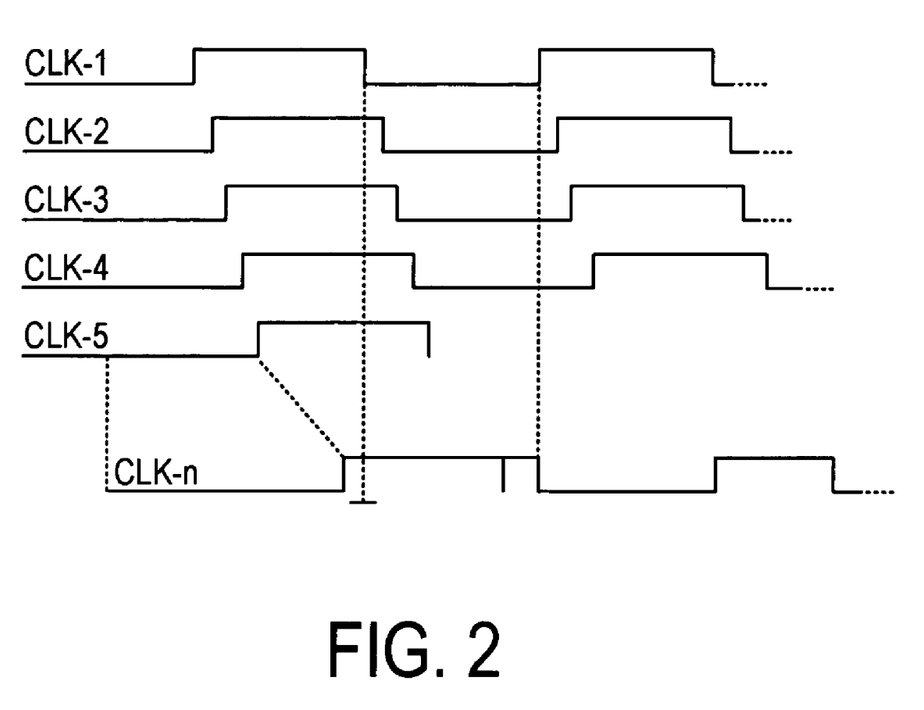
FIG. 2 is a timing graph illustrating one embodiment of the invention.

The system further includes a delay unit 128 that is made up of a flip flop unit 136 having an output Q, that is fed back to a Detect 2-pi Unit 124 that is configured to detect 2-pi as discussed above. The delay unit further includes a selection matrix 122. Each of the selection matrix 122 and flip flop unit 136 are configured to receive an input reference frequency 138, 27 MHz in this example, and provides a delay in the clock output. The delay line 134 connects the flip flop unit 136 with selection matrix 122 to help provide feedback to the 2-pi detector. The purpose of the delay unit 128 is to provide a "Doppler Shift" in the clock signal in a manner that ultimately shifts the output signal, SSCLK, into a different frequency range of interest. The effect of the incremental delay is illustrated in FIG. 2, where it is shown that he clock signals CLK1 through CLKn eventually shift 360 degrees, or 2-pi. This is detected in the 2-pi detector 124, and the system resets accordingly.

According to another embodiment of the invention, the system can be configured to calibrate the deviation in real time. The time the delay tap selected is such that one period of the signal is contained in the delay line, one can calculate the actual number of taps in one period, since the location of two rising edges are known. For example, if the rising edge came out from tap 176 and at that same time the Q output captured the future rising edge to be at location #10 (that is the rising edge coming out next in time), then this means that the period of the reference contains 176−10=166 tap. From this, the system can produce the percentage deviation based on that number, and the absolute delay of each tap can be ignored.

The register definition for one embodiment of this circuit is represented in pseudo code as follows.

```
// ==============================================
//
// register 0 :
// ============
// bit 7 : overwrite calibration and use register 2 and 3
// for settings when 1.
// bit 6:0 : factor number made from:
//
// frequency_modulation*2^14/center_frequency
//
// register 1 :
// ============
// bit 7 : frequency saturation indicator (read only)
// bit 6 : deviation saturation indicator (read only)
// bit 5 : enable spread spectrum == 1
// bit 4 : up/down spread selector down==0, up==1.
// bit 3:0 : frequency deviation selector
// 0: 1.0000 % 1: 1.5000 % 2: 2.0000 %
// 3: 2.5000 % 4: 3.0000 % 5: 3.5000 %
// 6: 4.0000 % 7: 4.5000 % 8: 5.0000 %
// 9: 5.5000 % 10:6.0000 % 11:6.5000 %
// 12:7.0000 % 13:7.5000 % 14:8.0000 %
// 15:8.5000 %
//
// register 2 :
// ============
// bit 7:0 : top of triangular wave when reg 0 bit 7 == 1
//
// register 3 :
// ============
// bit 7:0 : nfreq in the code when reg 0 bit 7 == 1
```

In operation, a control signals are received by the clock control 102 when calibrating SSCG, the system first sets the top and nfreq to get a certain modulation started. The deviation will depend on the delay per step and will be measured by the measuring module 140. For a given top and frequency of modulation, nfreq is set with the following formula $n\text{freq}=(2*\text{top}*2^{13}*f)/27e^6$ For example, if top=450 and f=30e3, then nfreq=8192.

Figure 4:
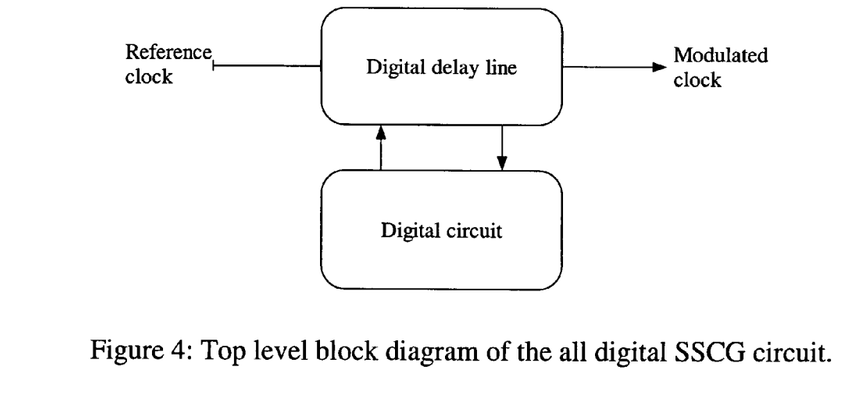
FIG. 4 is a diagrammatic view of one embodiment of the invention.

Referring to FIG. 4, a more simplified illustration of the invention is illustrated. Again, in the most basic level, the invention provides a delay line that operates between the reference clock and the modulated clock, and a digital circuit for performing the spread spectrum clock generation. In conventional approaches, analog systems are used. According to the invention, a much improved circuit can be configured with substantially improved results with all digital components.

Figure 5:
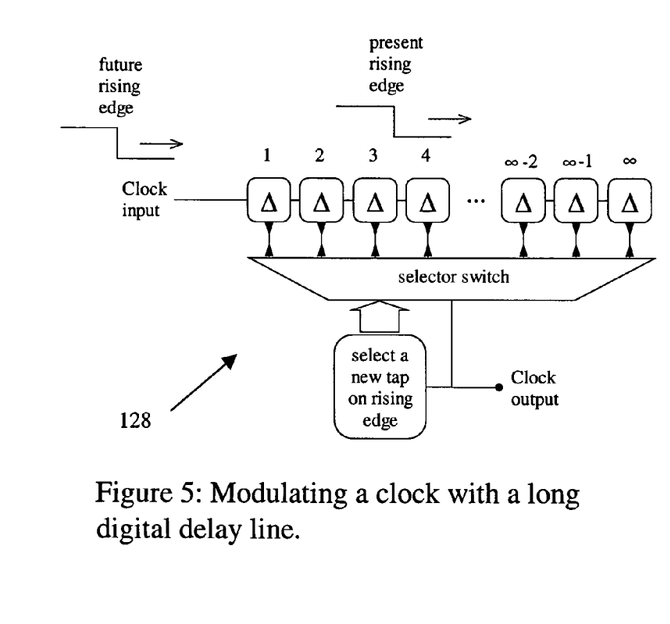
FIG. 5-8 are a diagrammatic views of a modulated clock according to different embodiments of the invention.

According to the invention, one can modulate the frequency of a reference clock with only a DDLi. FIG. 5 shows such a simplified configuration a new tap is selected in the delay unit 128 each time a rising edge comes out. If this new tap is further down the DDLi for each rising edge, the output frequency will come down as a function of the step size for the new taps. Should the step size be selected properly, one could modulate the reference clock with a triangular wave for example. One problem with this circuit is that the DDLi must be very long to be useful.

Figure 6:
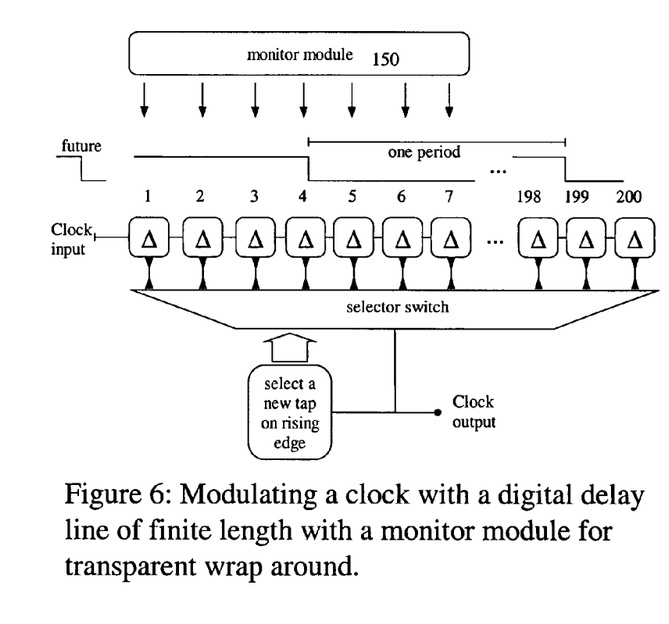
Figure 7:
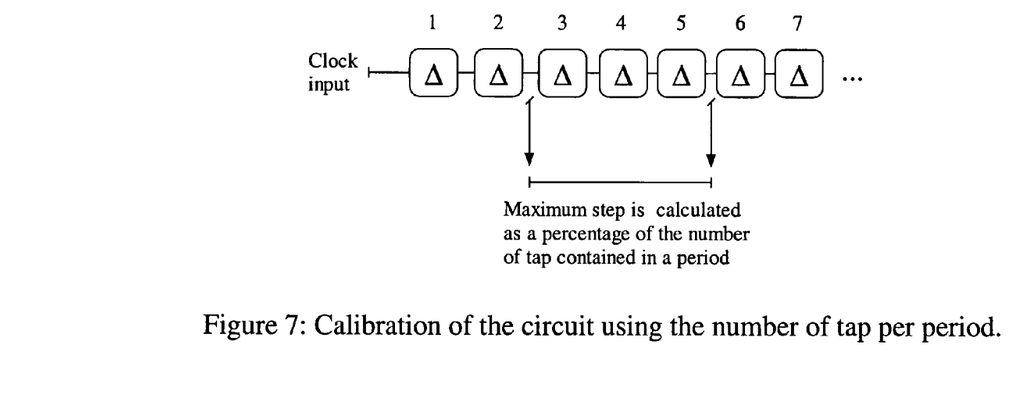

FIG. 6 shows a more practical circuit with a new monitor module 150. Using this configuration the same technique is used to modulate the frequency, but the electrical length of the DDLi is limited to at least one period of the reference. In this case, when the selected tap is close to the end of the DDLi, the future or next rising edge is already in the DDLi and can be detected by the monitor module. This information is used as a reference to set the next tap close to the beginning of the line. In Fact, When two rising edges are present in the DDLi, one could select a new tap based on the required new tap for the correct modulation, also can subtract the number of taps required for one period and come back to the beginning of the DDLi. The system can now modulate down the reference clock with a simple digital delay line and a dedicated digital circuit. In a practical application, there needs to be a calibrated output The frequency modulation and deviation needs to be calibrated for a practical application. In the case of the frequency modulation, it is obvious that if the reference frequency is known, then the frequency modulation can be adjusted as desired. The frequency deviation can also be calibrated easily. The deviation is a function of the step size delay and any time delay variation for each step due to process or temperature will cause the frequency deviation to change. Because the number of taps required to make a one-period delay, is known the calculation of an absolute delay value can be avoided, and the step size can be defined as a percentage of the number of taps in one period of the reference. FIG. 7 shows one example. To this point, the description has only shown an example of modulating the frequency downwards. Using the same DDLi and monitoring module the system can, also produce an up spread as well as a down spread.

Figure 8:
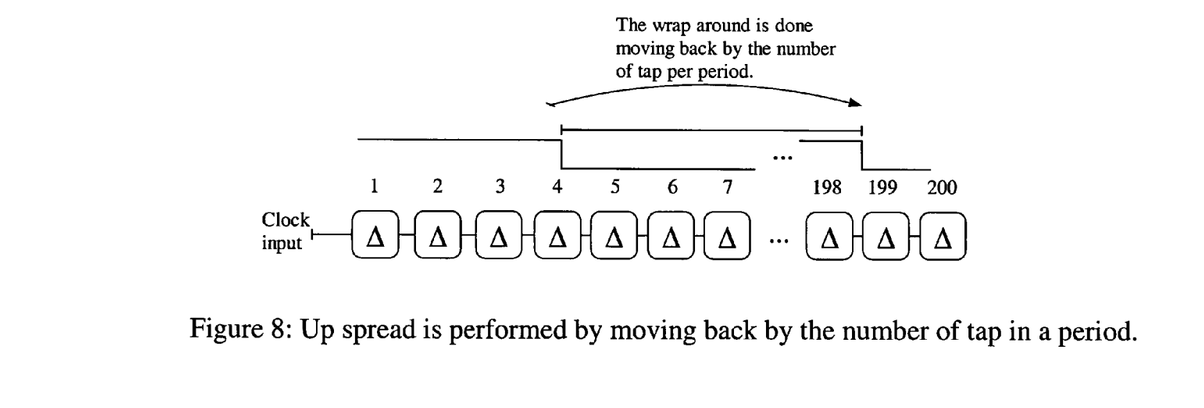

When doing an up spread, the process is actually moving in the opposite direction in the DDLi from one clock cycle to the other. Without any special techniques, and circumstances the system would quickly "crash" at the beginning of the DDLi is the same way it would "crash" at the end of the DDLi with down spread. At all times, the number of taps required to form one period is kept, the process can move back by the right amount of tap knowing where the rising edge is located and how many taps are in one period. Referring to FIG. 8, an up-spread is ullustrated showing the process of an up-spread by moving back by the number of taps in a period, to perform a wrap-around.

The up or down spread modulation can be generated on the reference clock with the system describe above. A legitimate concern regarding the system would be that the quantized nature of the step on the DDLi, which could result in a cycle-to-cycle jitter above the maximum acceptable level. According to the invention, there are three elements that help keep this undesired effect under control. First of all, the delay of each tap will never be the same, and hence the distribution of the delay on a per tap basis will help keep the jitter down. Also, this circuit is designed such that it can be inserted between a reference and the system PLL. The limited bandwidth of the system PLL will tend to smooth the actual quantization of the circuit. Finally, A Delta Sigma modulator is placed is the digital section allowing dithering of the tap step size.

Using the techniques described above, one embodiment of a circuit embodying the invention can be implemented in a 0.15 μm CMOS process. In the following embodiment, an actual DDLi implementation is illustrated with, an overview of the digital section, and two refinements for the wrap around circuit are disclosed where one period of the clock is removed from the line.

Figure 9:
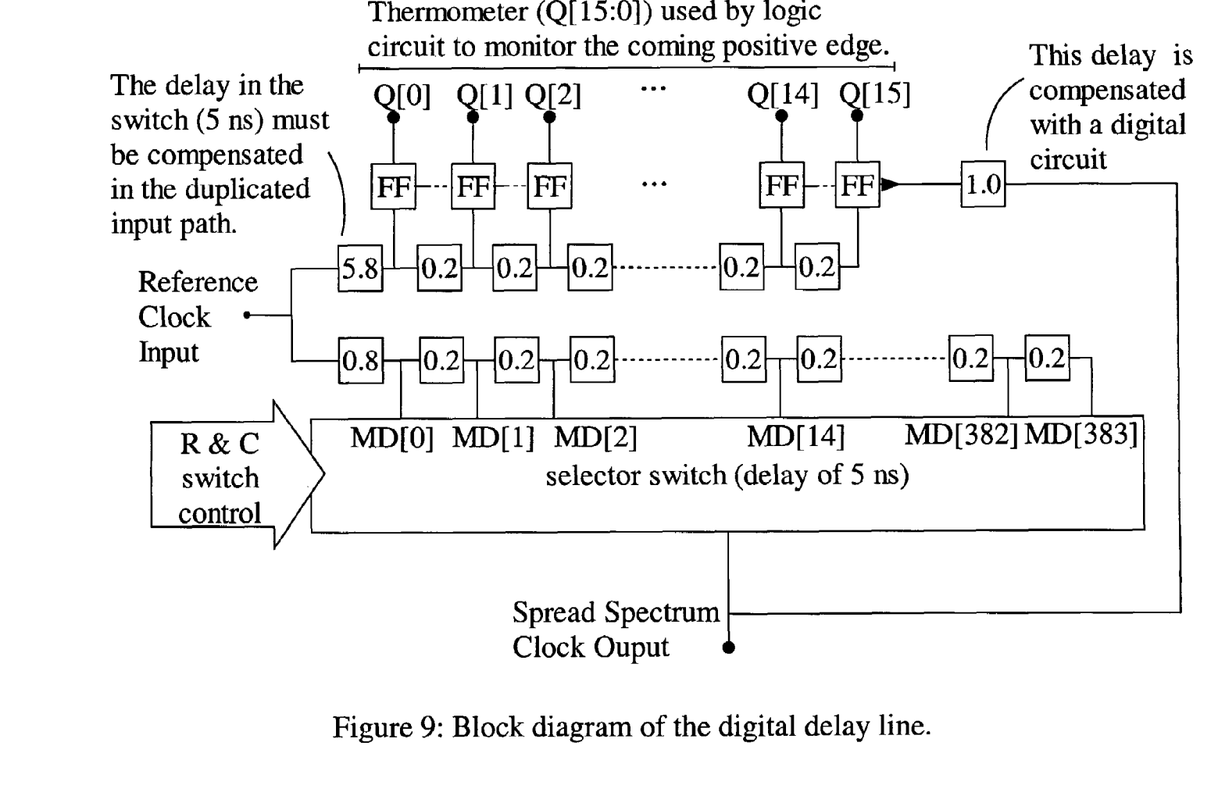
FIG. 9 is a diagrammatic view of a digital delay line according to one embodiment of the invention.
Figure 10:
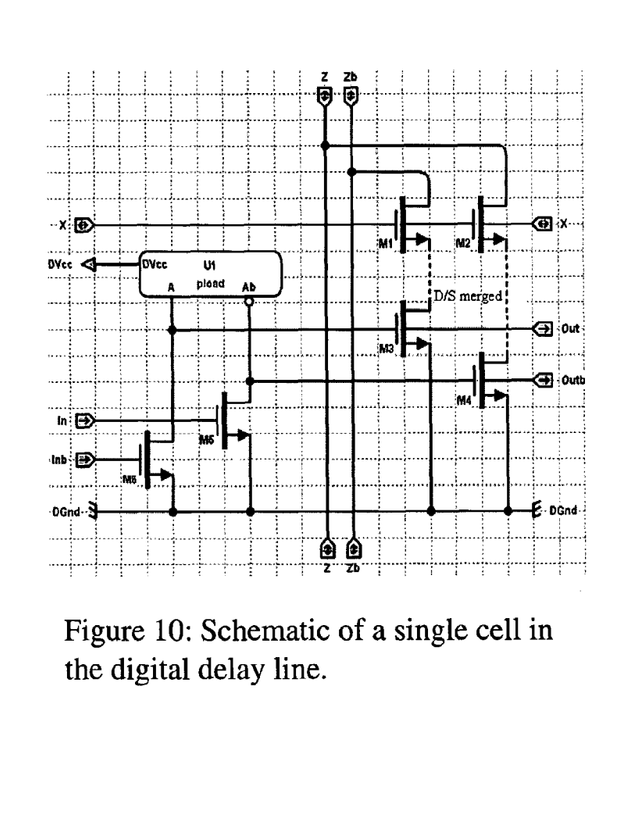
FIG. 10 is a diagrammatic view of a single cell of a digital delay line according to one embodiment of the invention.
Figure 11:
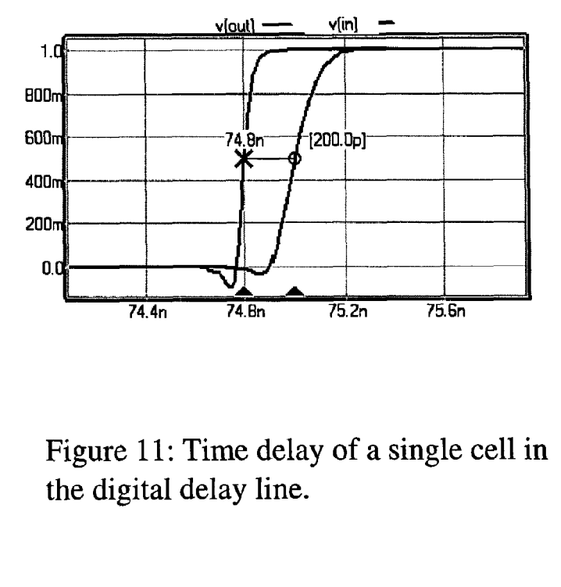
FIG. 11 is a graph of time delay of the single cell of FIG. 10.

In one embodiment, the DDLi is made from 384 (24×16) inverter buffers placed on a matrix multiplexer as illustrated in FIG. 9. The first 16 taps are duplicated and each of their outputs is connected to a bank of D-type flip-flop. This arrangement is used to monitor the arrival of the rising edge in the DDLi. FIG. 10 shows the basic delay cell. FIG. 11 shows the actual delay of approximately 200 ps. In FIG. 10, the delay cell is made with two NMOS devices driven with a differential signal from the previous cell. The NMOS load is a pair of cross-coupled PMOS devices inside the box labeled "pload" (see FIG. 10). It is basically a differential input/differential output inverter. Each delay cell drives the following identical cell. The wire X and Z in that cell are the grid of the matrix multiplexer. The delay cell is connected to the lower gates all the time so that the delay does not change when the row is selected, thus, each delay cell sees the same load.

Figure 12:
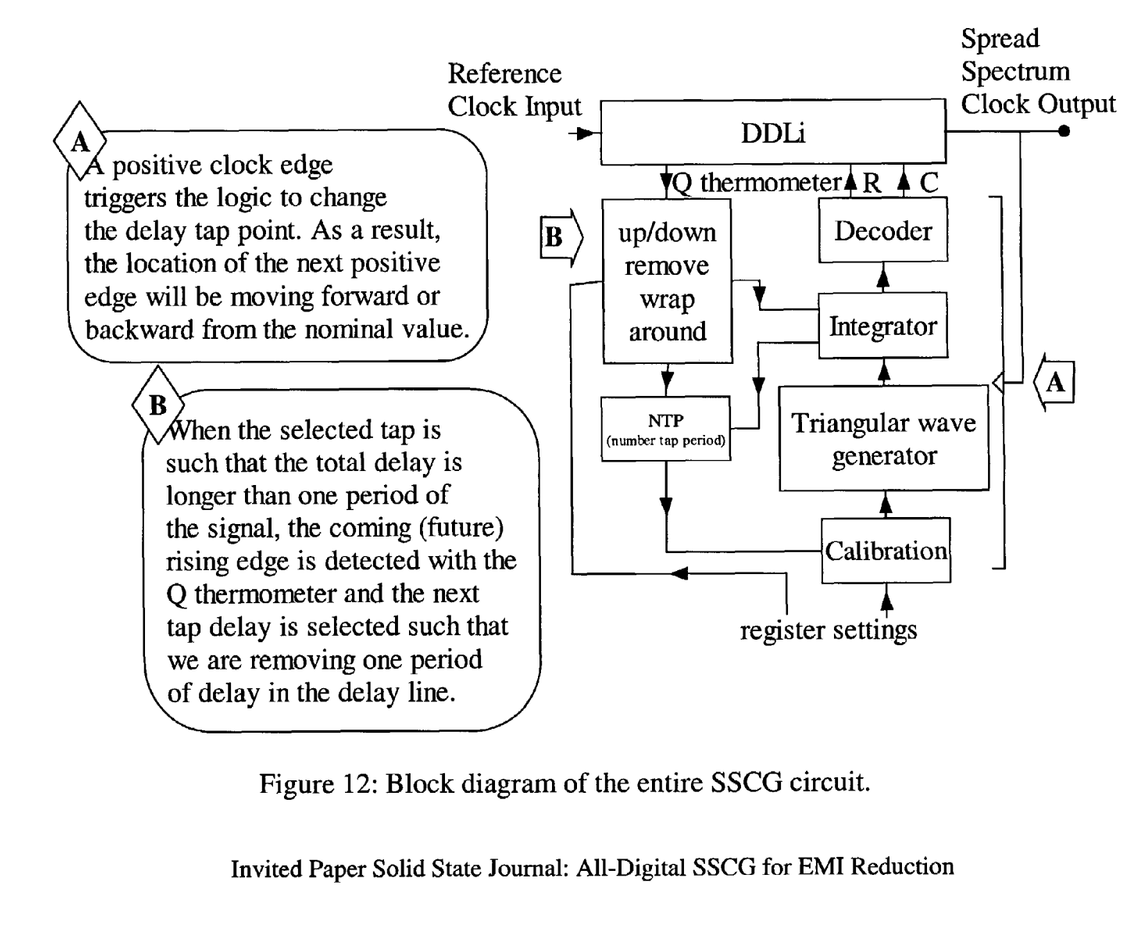
FIG. 12 is a diagrammatic view of an SSCG circuit according to one embodiment of the invention

The digital circuit designed to control the DDLi is shown in FIG. 12. For a desired frequency modulation and frequency deviation, the user sets registers in the calibration module. Searching for the number of taps per period as explained above and looking at the desired modulation, calibration is performed. This delay per tap can vary with temperature and process and since the circuit measures this variable continuously, the circuit remains calibrated. Based on the request and the number of taps per period calculated by the same module, a triangular wave is set to the required frequency and amplitude. By integrating this wave, the required delay is obtained on the DDLi to produce the modulated clock with a down spread. A decoder is required to control the DDLi. When the actual delay of the delay line becomes one period in length, the Q output of the flip-flop in the DDLi will show the exact location of the rising edge (the future rising edge) and then the wrap around module will reset the integrator to remove one period of the clock exactly. This process of removing one period of the clock in the DDLi can be done to within a one tap delay of accuracy by using the position of the edge as sampled by the bank of flip-flops.

Finally, there are two refinements on the circuit to give a separate embodiment of the invention that improves accuracy. In the design of the duplicated row in the DDLi, it is critical to compensate for the delay of the multiplexer switch with the same delay in front of the duplicated row. This delay in the block diagram of FIG. 9 is set to 5 nsec. The reason for compensating these two delays is that, if the flip-flops are triggered later than they should, one can compensate by an equal delay in the duplicated path.

Additional delay mismatch in the hardware can also be compensated. For example, a buffer on the clock for the FF or mismatch for the multiplexer switch can accumulate up to 1.0 nsec and still be compensated. Those delays would in turn create a step discontinuity in the triangular wave modulation at the wrap around time. These delays can be compensated for in the digital section with an adaptive circuit. The adaptive circuit can monitor the successive rising edges in the bank of flip-flops and so can detect the discontinuity when the wrap around is applied. This discontinuity is then removed by successively reducing the error in a simple control loop.

Figure 13:
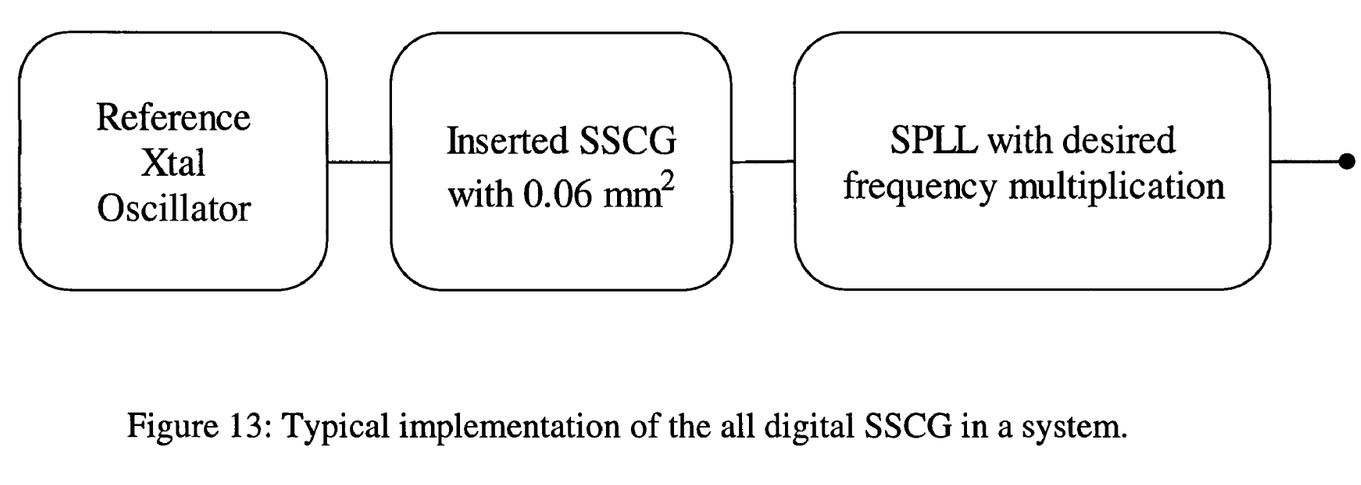
FIG. 13 is a diagrammatic view of a SSCG circuit implemented between a reference oscillator and a phase locked loop according to one embodiment of the invention.

The implementation of the circuit in a system is made simple since no modification is required in the system PLL. As shown in FIG. 13, the circuit is inserted between the reference and the system PLL allowing a low risk upgrade of the system with SSCG. This according to the invention, the circuit can be implemented independently from the reference oscillator and the system PLL, greatly simplifying the implementation.

Figure 14:
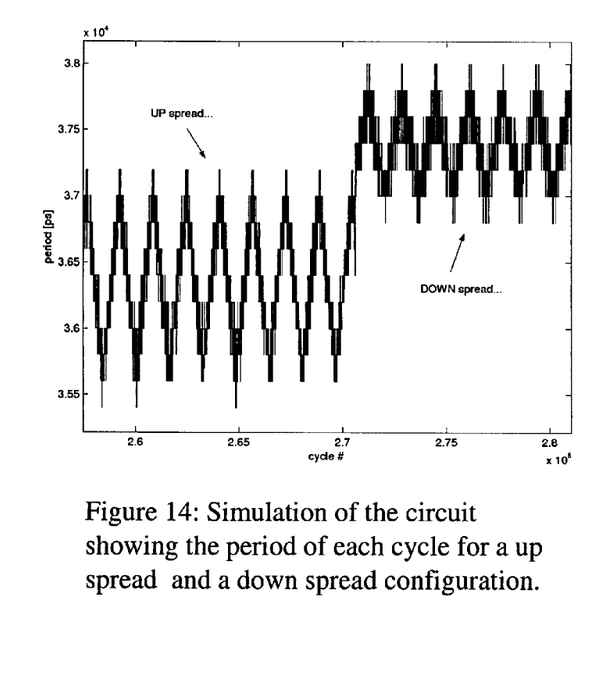
FIGS. 14-18 are timing diagrams illustrating performance tests of a circuit configured according to the invention.
Figure 15:
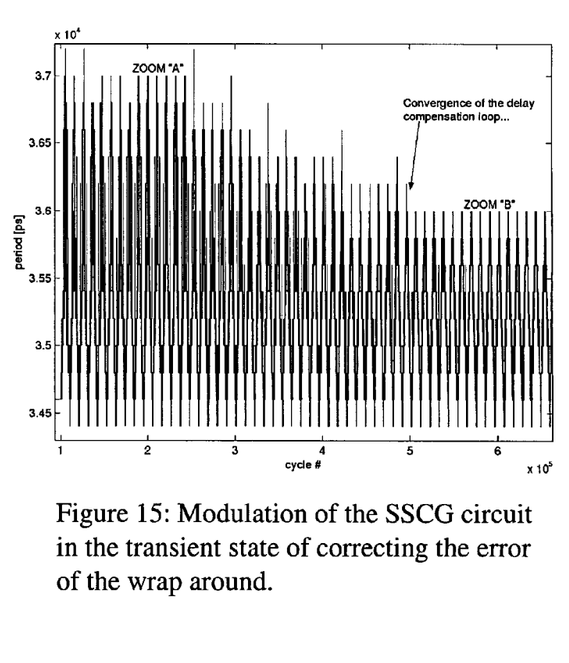
Figure 16:
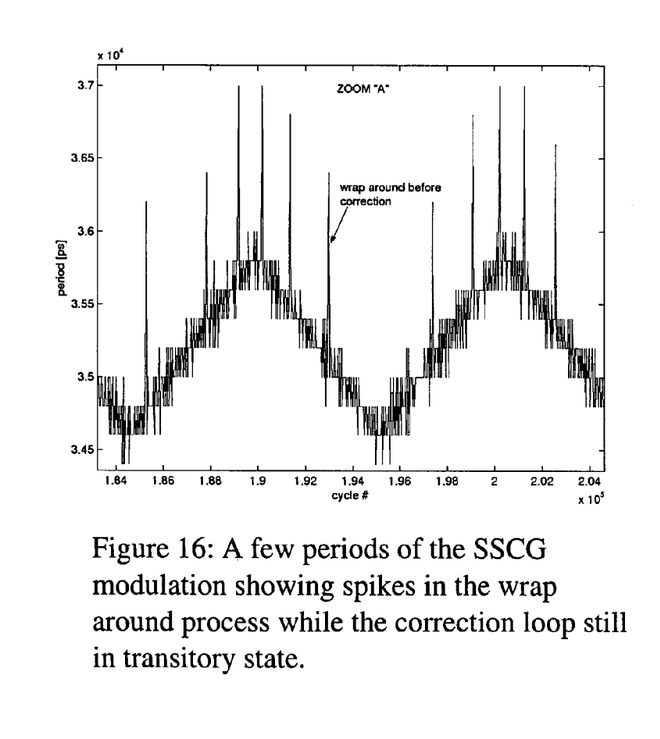
Figure 17:
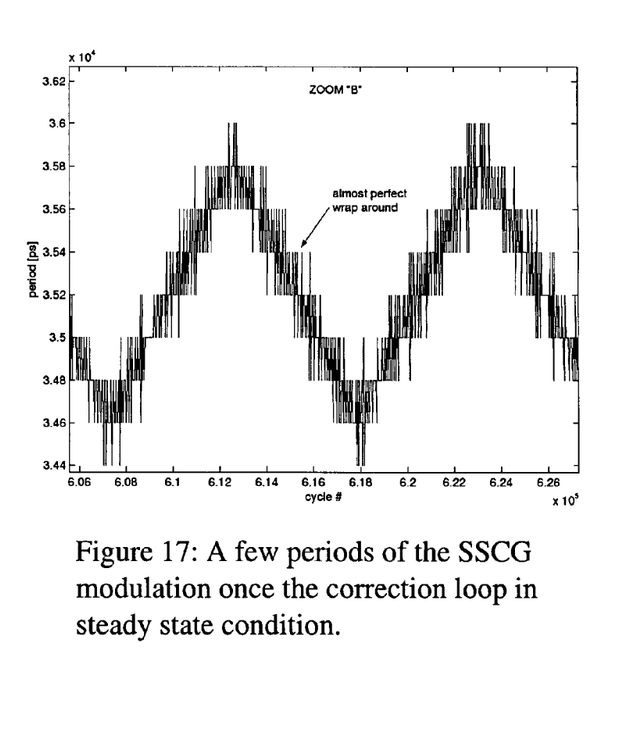

There are many ways to look at the performance of the SSCG. FIG. 14 shows the simulation of the circuit when the up and down spread is set. The plot shows that, for each successive clock cycle, the corresponding period of the clock is as shown. For this simulation, an ideal delay line is used with a fixed delay of 200 ps for each tap. This explains the quantized steps on the triangular wave. FIGS. 15, 16 and 17 shows the adaptive circuit in the transitory state. The simulated additional mismatch delay is 1 nsec and is compensated for as shown in FIG. 17.

Figure 18:
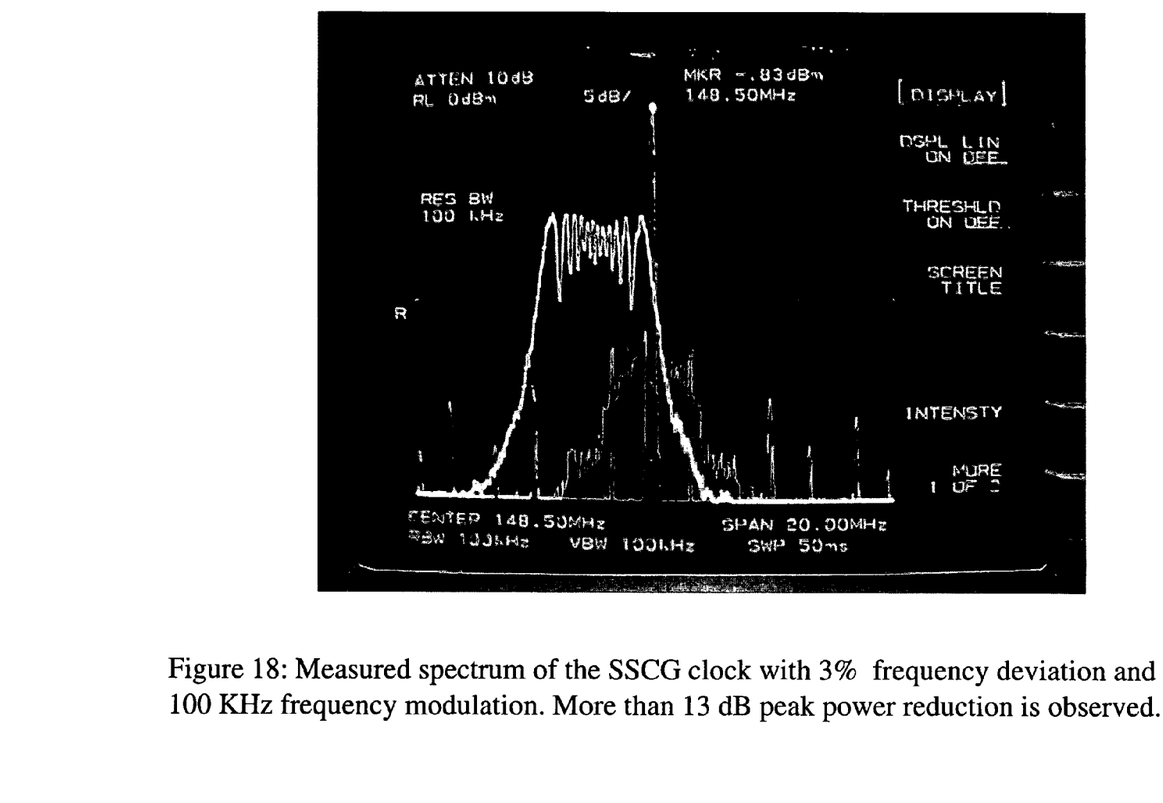

FIG. 18 is the spectrum of the clock as measured from the chip. The resolution bandwidth and the video bandwidth for this measurement is 100 KHz. The reduction of peak power from the reference clock is greater than 13 dB for a deviation of about 3% and a frequency modulation of 100 KHz. Note that the measured results is at the output of the system PLL, and that the simulated results have not been translated in frequency by a factor of 5.5.

The relationship between the peak power reduction (PPR) and the frequency modulation and deviation are illustrated in the above plots. The greater the deviation or the modulation, the better the PPR. However, they are not strictly proportional. It appears that the PPR reach a plateau when the deviation is at about 3% and the modulation is at about 80 KHz. After that, faster modulation or greater deviation have little effect on peak power reduction.

In yet another embodiment, a ring oscillator can be made from N elementary gate cells. The number of gates N is function of the operating frequency and the practical gates delay. For example, 200 ps delays with 92 gates would provide approximately 27 MHz. A selecting switch can be installed on all outputs of the ring oscillator such that one can select any output of the oscillator. Software can be configured and that controls the switch over time and a PLL to control the frequency.

In one embodiment, the ring oscillator is configured as a VCO and integrated into a PLL. The PLL may or may not have a multiplication factor. Once locked to a reference, the frequency can be modulated using the selector switch by "advancing" on the signal or "escaping" on the signal. (This is similar to a doppler shift, such as when an ambulance arrives where the siren has a higher pitch, and when it departs, the frequency goes down bit.). There is no need to remove 2-pi or perform any reset because the system is in a virtual ring that operates and repeats round and round.

The ring oscillator may be configured as a fixed oscillator. For example, a 26 MHz oscillator with a reference of 27 MHz. The output of the selector switch is then use to digitally lock the signal to the reference. Here all we mean is that the oscillator remains in fact at 26 MHz but the selector switch constantly move the tap point "forward" such that the output frequency is locked to the higher frequency reference. Once done, we simply superimposed the modulation onto the tap selected sequence.

The invention has been described in the context of an improved spread spectrum clock generator. However, the embodiments described herein are intended as examples, but do not limit the spirit and scope of the invention, which is defined by the appended claims.

The invention claimed is:

1. A spread spectrum clock generation circuit comprising:
   a delay line configured to spread the spectrum of a reference clock signal having a reference clock frequency;
   a delay circuit configured to generate an adjustment signal to the delay line by adding a delay change to or subtracting the delay change from the delay line per cycle of the reference clock frequency, therefore causing a shift in the output clock frequency of the spread spectrum clock generation circuit, wherein the amount of shift is proportional to the rate of addition or subtraction of the delay change.

2. A circuit according to claim 1, where the delay circuit is configured to enable an optimum pattern of frequency shifts as a table of delay versus clock cycle.

3. A circuit according to claim 1 wherein the clock circuit generating the reference clock signal is one of a crystal and a phase locked loop (PLL) circuit.

4. The circuit of claim 1, wherein the delay circuit calculates the shift in output frequency as a percentage of a number of taps in the delay circuit corresponding to one period of the reference clock frequency.

5. The circuit of claim 1, wherein the delay circuit wraps around the delay line by a total delay corresponding to a period of the reference clock frequency.

6. The circuit of claim 1, wherein the delay circuit wraps in a forward direction around the delay line by a total delay corresponding to a period of the reference clock frequency.

7. The circuit of claim 1, wherein the delay circuit wraps in a backward direction around the delay line by a total delay corresponding to a period of the reference clock frequency.

8. The circuit of claim 1, further comprising:
   a clock circuit generating the reference clock frequency; and
   a system phase lock loop;
   wherein the delay line and the delay circuit are between the clock circuit and the system phase lock loop.

9. The circuit of claim 1, further comprising:
   a delta sigma modulator dithering a step size of taps in the delay line.

10. The circuit of claim 1, wherein the delay line includes duplicated taps that monitor a clock edge.

11. The circuit of claim 1, further comprising:
    a reference clock circuit generating the reference clock signal as the reference clock frequency.

12. The circuit of claim 1, wherein the delay circuit wraps around the delay line by a total delay corresponding to a period of the reference clock frequency, and
    wherein the delay line includes adaptive circuitry compensate for discontinuity responsive to the delay circuit wrapping around the delay line.

* * * * *